United States Patent [19]
De Santis

[11] Patent Number: 5,311,905
[45] Date of Patent: May 17, 1994

[54] REMOTE DUMP AND SAFETY VALVE

[75] Inventor: Gerard J. De Santis, Battle Creek, Mich.

[73] Assignee: Hytech Pumps International Inc., Bedford, Mich.

[21] Appl. No.: 9,465

[22] Filed: Jan. 26, 1993

[51] Int. Cl.⁵ ............................................. G05D 16/00
[52] U.S. Cl. .................................. 137/613; 137/115; 417/307
[58] Field of Search ............... 137/613, 115, 117, 118; 417/307, 308, 309

[56] References Cited

U.S. PATENT DOCUMENTS

| | | | |
|---|---|---|---|
| 3,322,134 | 5/1967 | Enemark | 137/115 X |
| 3,455,322 | 7/1969 | Chichester | 137/115 |
| 4,589,825 | 5/1986 | Schmidt | 417/307 X |
| 4,791,950 | 12/1988 | Pedersen | 137/115 |

*Primary Examiner*—Gerald A. Michalsky
*Assistant Examiner*—Kevin L. Lee
*Attorney, Agent, or Firm*—Flynn, Thiel, Boutell & Tanis

[57] ABSTRACT

A remote pressure sensitive dump valve which includes a housing having first, second and third fluid ports, the first fluid port adapted for connection to a source of very high pressurized fluid, the second fluid port being adapted for connection to a remotely controllable fluid control valve and the third fluid port being adapted for connection to a conduit for dumping fluid back to a pump reservoir when the remote controllable fluid control valve is in the closed position. The housing includes a chamber in which is provided an elongated valve member which is reciprocal therein between first and second positions. The position of the valve member is directly responsive to the opened or closed condition of the remotely controllable fluid control valve. An annular valve seat is provided on the valve member and in the chamber so that when the valve member is moved to the first position, the first and second annular valve seats will be in engagement with one another and the remotely controllable fluid control valve will be open. When the remotely controllable fluid control valve is closed, fluid flow through the valve member will be halted to hydraulically cause a sufficient pressure imbalance between the opposite ends of the valve member to effect an automatic movement of the valve member from the first position to a second position wherein the first and second annular valve seats are separated to allow fluid to exit from the chamber to the return line.

22 Claims, 2 Drawing Sheets

REMOTE DUMP AND SAFETY VALVE

FIELD OF THE INVENTION

This invention relates to a remote pressure sensitive dump valve and, more particularly, a valve that is responsive to fluid flow therethrough from a high pressure pump such that when fluid flow ceases, fluid through the valve is diverted to a conduit for resupplying the pump reservoir.

BACKGROUND OF THE INVENTION

Pumps capable of operating at extremely high pressures, namely, pressures in the range of 10,000 to 40,000 PSI have become an important facet in a number of industries. One industry includes water blasting wherein water is jettisoned from a small orifice nozzle at pressures in the range of 10,000 to 40,000 PSI and at a sufficient gallonage rate to effect a literal blasting of water against a surface for purposes of cleaning it and even including eroding it. Oftentimes, the nozzle arrangement is embodied in a hand gun with appropriate valving on the hand gun for facilitating fluid flow through the valve as well as halting fluid flow through the valve. When high fluid pressures are being utilized, extreme care must be taken to assure that when the hand held valve is turned OFF, the fluid within the conduit leading to the valve on the hand gun be appropriately vented so as to prevent a bursting of the conduit or valve body. Heretofore, conduits with pressures in the range of 10,000 to 40,000 PSI therein have required a dump or shut off gun to be utilized, namely, a hand held lance-gun having a dump or shut off flow feature associated therewith which causes fluid to be diverted to the atmosphere at a very low velocity immediately upon the closing of the valve to halt fluid flow to the nozzle. One of the drawbacks in this type of arrangement is, while in the dump mode, excessive water from the gun dump port is spilled into the work environment increasing liquid contaminant clean up and disposal requirements. In addition, when the shut off gun is used, the conduit extending between the pump and the hand gun still has the high pressure fluid contained therein, namely, fluid at a pressure of 10,000 to 40,000 PSI. If the conduit should be pierced, such as might happen when a vehicle runs over the conduit, there is the danger that the conduit will become violently manipulated by the exiting high pressure fluid to cause injury to personnel and/or equipment located within the region.

Accordingly, it is an object of this invention to provide a remote pressure sensitive dump valve that is adapted to be connected directly to the outlet port from a high pressure pump and to enable the use of hand held guns which are free of the provision of any auxiliary dump valve diverting blocked fluid flow to the atmosphere.

It is a further object of the invention to provide a remote pressure sensitive dump valve, as aforesaid, which when dumping the fluid flow from the pump in response to a closing of a hand held gun, the pressure in the conduit extending from the outlet of the dump valve to the gun is at a low pressure thereby minimizing the likelihood of injury to personal and/or damage to equipment located close by should the conduit be inadvertently severed.

It is a further object of the invention to provide a remote pressure sensitive dump valve, as aforesaid, wherein a dumping of the high pressure fluid (liquid) to atmosphere is hydraulically assured promptly upon the occurrence of a halting of the fluid flow through the dump valve to thereby prevent damage to the hose and/or hand gun.

It is a further object of the invention to provide a remote pressure sensitive dump valve, as aforesaid, wherein the dump valve is comprised of a minimum number of component parts thereby making the durability thereof and the maintenance thereof simple and easy.

It is a further object of the invention to provide a remote pressure sensitive dump valve, as aforesaid, wherein the pressure at which the dump valve is activated in controllable by the provision of at least one replaceable orifice plug in an end of a shiftable valve member remote from the fluid supply port on the dump valve and through which the fluid deliverable to the hand held gun must flow in order to assure a proper control movement of the valve member relative to a valve seat provided in the dump valve.

It is a further object of the invention to provide a remote pressure sensitive dump valve, as aforesaid, wherein a further replaceable orifice plug is provided in a return conduit into which fluid, here liquid, is dumped when the valve or the hand gun is closed, the cross-sectional area of the orifice in the further orifice plug is the same as the orifice in the orifice plug oriented on the valve member.

SUMMARY OF THE INVENTION

In general, the objects and purposes of the invention are met by providing a remote pressure sensitive dump valve which includes a housing having first, second and third fluid ports, the first fluid port being adapted for connection to a source of very high pressure, pressurized fluid, the second fluid port being adapted for connection to a remotely controllable fluid control valve (gun) and the third fluid port being adapted for connection to a conduit for dumping fluid back to a pump reservoir when the remote controllable fluid control valve is in the closed position. The housing includes a chamber in which is provided an elongated valve member which is reciprocal therein between first and second positions. The position of the valve member is directly responsive to the opened or closed condition of the remotely controllable fluid control valve (gun). An annular valve seat is provided on the valve member and in the chamber so that when the valve member is moved to the first position thereof, the first and second annular valve seats will be in engagement with one another and the remotely controllable fluid control valve (gun) will be open. When the remotely controllable fluid control valve is closed, fluid flow through the valve member will be halted to thereby hydraulically cause a sufficient pressure imbalance between the opposite ends of the valve member to effect an automatic movement of the valve member from the aforesaid first position to a second position wherein the first and second annular valve seats are separated to allow fluid to exit from the chamber to the aforesaid return line.

BRIEF DESCRIPTION OF THE DRAWINGS

Further objects and purposes of this invention will be apparent to persons acquainted with apparatus of this general type upon reading the following specification and inspecting the accompanying drawings, in which.

DETAILED DESCRIPTION

Figure 1:
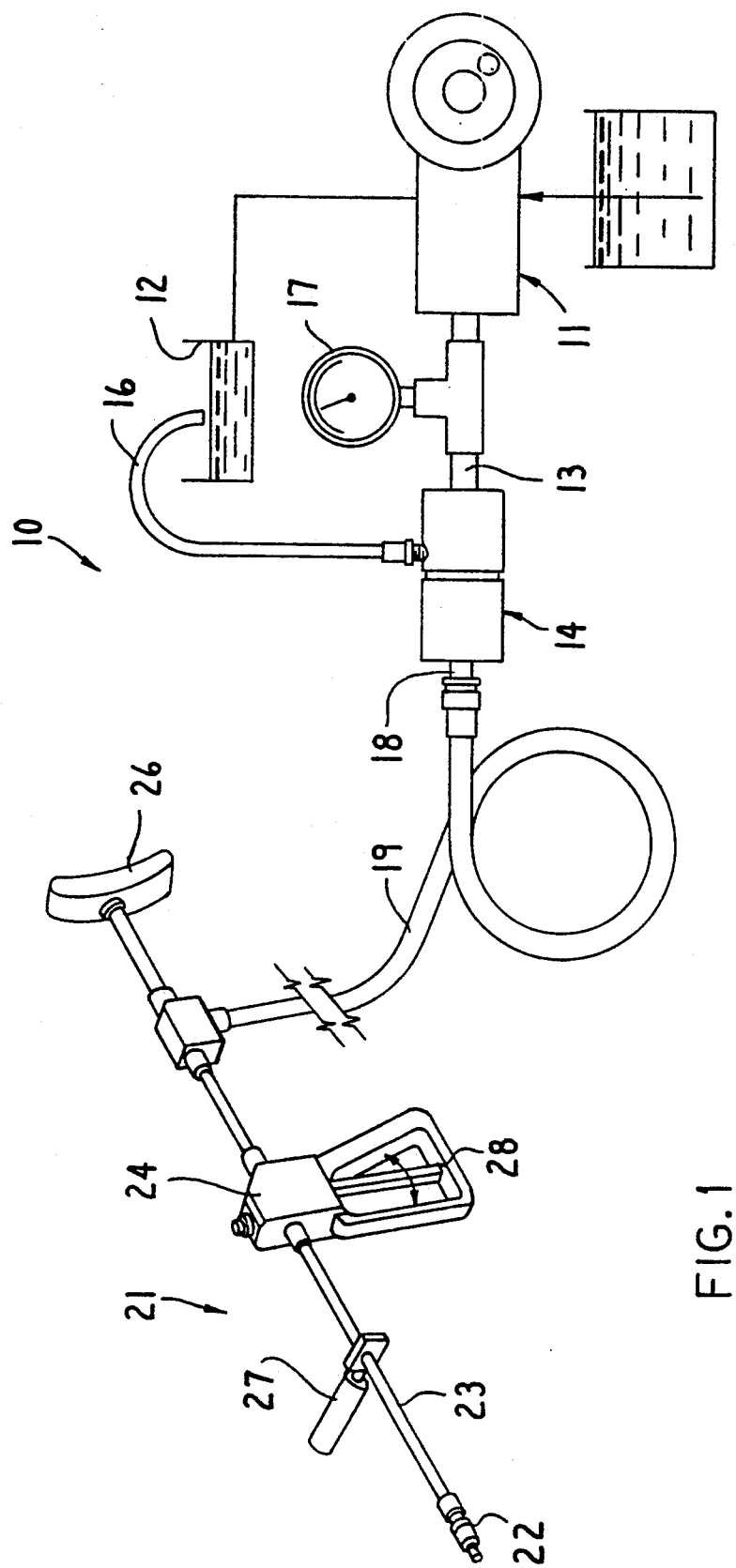
FIG. 1 is an isometric view of a high pressure spray system utilizing a remote pressure sensitive dump valve embodying the invention.

FIG. 1 illustrates a system 10 utilizing a high pressure pump 11 drawing liquid from a reservoir 12 and delivering it via an inlet port 13 to a remote pressure sensitive dump valve 14 embodying the invention. A return line 16 is provided for returning dumped fluid back to the reservoir 12. A high pressure gauge 17 operable from 0 PSI to a high pressure of, for example, 40,000 PSI, is connected between the outlet of the pump 11 and the inlet port 13 to the valve 14. An outlet port 18 on the dump valve 14 is connected to one end of a high pressure hose 19 that extends between the pressure gauge 18 and a hand held gun 21 adapted to control the flow of fluid through the hose 19 and to the outlet spray nozzle 22 at the end of the barrel 23 of the gun 21. Since a recoil force will be caused by a turning of the valve 24 on the gun 21 to "ON" to allow fluid flow to the nozzle 22, a shoulder engaging stock 26 is provided at the end remote from the nozzle 22 and a handle 27 is mounted on and extends to the side of the barrel 23 to facilitate a use of the user's shoulder and arms to oppose the recoil force. A trigger 28 is provided for controlling fluid flow through the valve body 24 between fully "OFF" and fully "ON".

Heretofore, it has been common practice to utilize a spray gun having a dump valve provided within the valve body 24 so that when the trigger 28 thereof was moved to the OFF position thereby blocking flow of fluid through the valve body, liquid would be promptly diverted or dumped to the atmosphere through an opening in the valve body. When pressures in the range of 10,000 to 40,000 PSI were being outputted by the pump mechanism, that high pressure remained in the hose extending between the outlet port of the pump and the inlet port to the hand held gun. Since considerable distance usually exists between the pump and the hand held gun, there was a considerable risk that the hose could become damaged, cut or the like thereby causing the hose to move violently in response to high volume, high pressure fluid exiting therefrom to cause injury to personnel within the region and/or damage to equipment within the region.

Since users of high pressure pumps in the field have a variety of different guns, some customers do not necessarily have a gun with a dump feature associated therewith. Thus, Applicant's system has been designed for use with a hand held gun that does not have a dump feature associated therewith. Thus, when the valve on the gun is turned OFF, such as would be the case with the valve 24 described above, and without any fluid dump feature associated with the system at all, the output pressure of the pump 11 would climb well beyond the rated pressure output for the pump to cause possible damage thereto and possible rupturing of the conduit extending between the outlet port and the gun. Thus, I have provided a remote pressure sensitive dump valve 14 at the location described above, namely, at a location immediately adjacent the outlet port of the pump 11.

Figure 2:
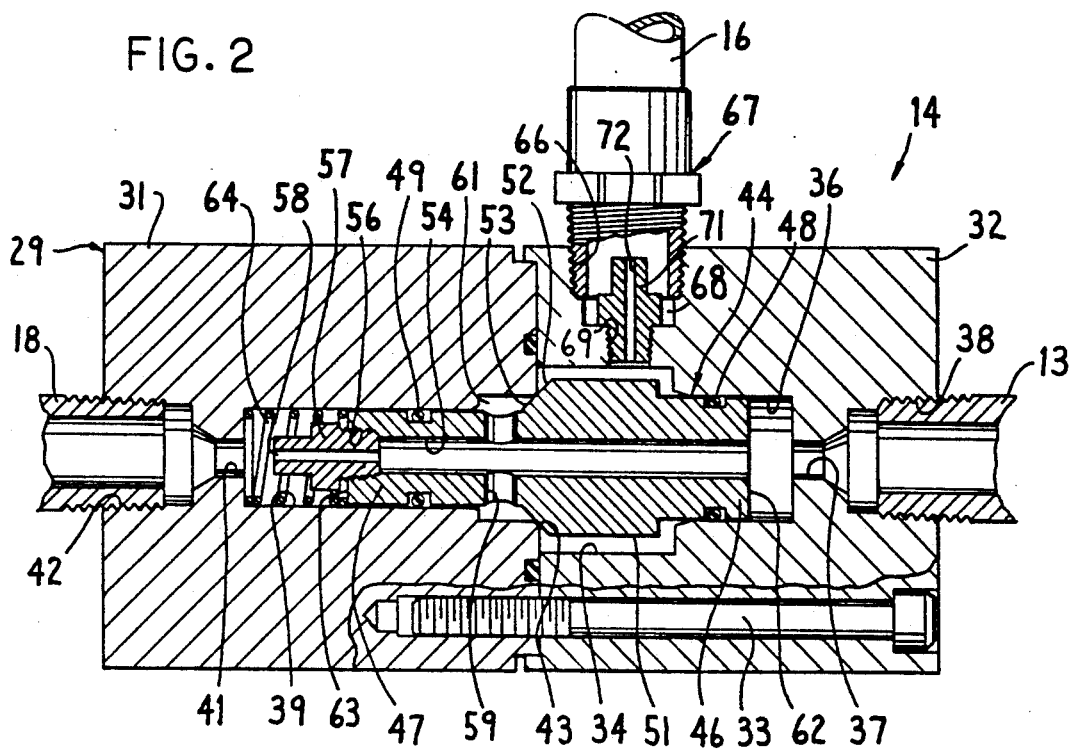
FIG. 2 is a central longitudinal sectional view through a dump valve which embodies the invention.
Figure 3:
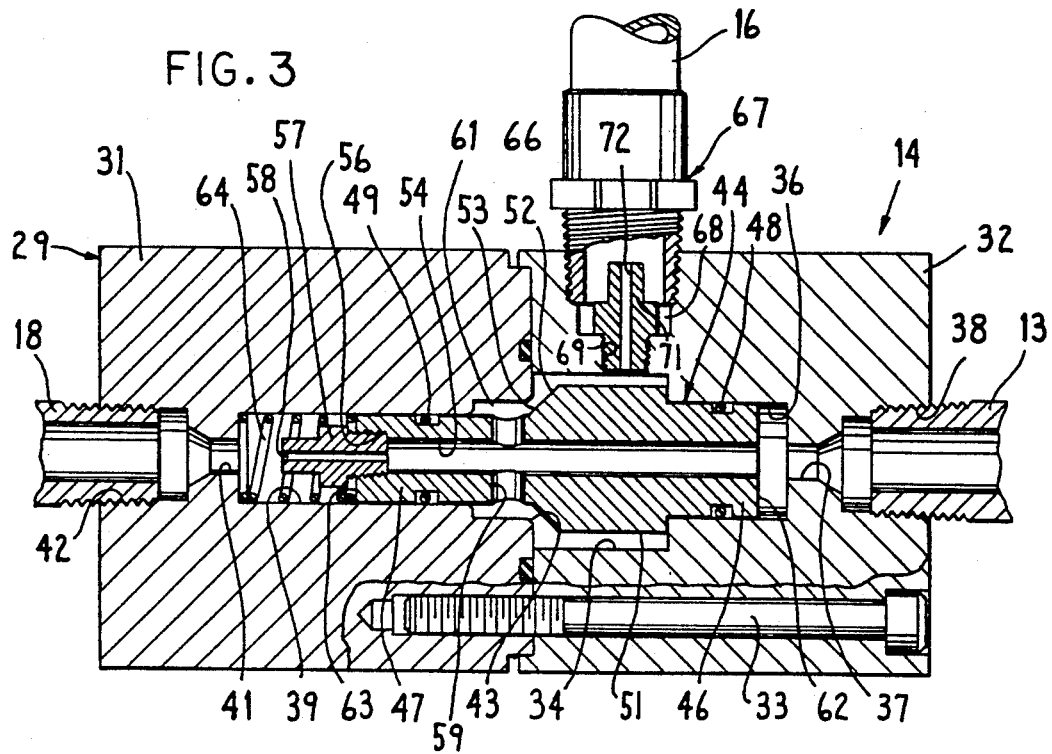
FIG. 3 is a central longitudinal sectional view similar to FIG. 2, but with the valve member shifted to a second position thereof.

FIGS. 2 and 3 show in more detail the construction of the remote pressure sensitive dump valve 14. The dump valve 14 includes a valve body 29 composed of two valve body parts 31 and 32 connected by a plurality of elongated screws 33, only one of which is illustrated in FIGS. 2 and 3. The valve body 29 further includes a chamber 34 therein having extending from one side thereof a cylindrical passageway 36, at the end remote from the chamber 34 of which extends a passageway 37 connected in fluid circuit with an internally threaded first fluid port 38 defining the inlet port 13 to the dump valve 14. A further cylindrical passageway 39 extends from another side of the chamber 34 and coaxially with the cylindrical passageway 36. A further passageway 41 at the end of the cylindrical passageway 39 remote from the chamber 34 provides fluid communication from the cylindrical chamber 39 to an internally threaded second fluid port 42 which defines the aforesaid outlet port 18 from the dump valve 14. The chamber 34 is larger in cross-sectional size than the cross-sectional dimension of the cylindrical passageways 36 and 39. In addition, the cross-sectional area of the cylindrical passageway 36 is greater than the cross-sectional area of the cylindrical passageway 39. A first annular valve seat 43 is provided in the chamber 34, particularly at the mouth of the cylindrical passageway 39.

A valve member is supported for reciprocal movement in the chamber 34 and the coaxially oriented cylindrical passageways 36 and 39. In this particular embodiment, the valve member 44 includes a pair of oppositely extending cylindrical extensions 46 and 47, each of which is respectively received in the cylindrical passageways 36 and 39 to support the valve member 44 for reciprocal movement. Appropriate O-ring seals 48 and 49 are provided in annular grooves encircling the cylindrical extensions 46 and 47, respectively. The axially central portion 51 of the valve member 44 is larger in diameter than the cylindrical extensions 46 and 47. A chamfered surface 52 is provided on an axially facing side of the central portion 51 which opposes the annular valve seat 43 so as to define a second annular valve seat 53. The annular valve seat 53 is adapted to move toward and away from the annular valve seat 43.

A central passageway 54 extends lengthwise of the valve member 44 and, in this particular embodiment, through the central portion thereof. The end of the passageway 54 adjacent the outlet port 18 from the valve body 29 includes an internally threaded opening 56 into which is received an orifice plug 57 having a small diameter orifice 58 extending lengthwise therethrough and communicating with the passageway 54. The orifice plug 47 has a threaded end thereon adapted to be threadedly engaged in the opening 56. Approximately midlength of the passageway 54 there is provided a further and transversely extending passageway 59 which is connected in fluid circuit with the passageway 54. The passageway 59 opens into the chamber 34 through an enlarged segment 61 of the cylindrical passageway 39, particularly the segment immediately adjacent the chamber 34. In this particular embodiment, the cross-sectional area of the passageways 54 and 59 are the same and are approximately the same as the cross-sectional area of the passageways 37 and 41.

The axially facing surface at an end 62 of the valve member 44 is greater than the corresponding exposed surface area at an opposite end 63. However, the sum of the axially facing cross-sectional area at the end 63 and the axially facing cross-sectional area of the second valve seat 53 is greater than the cross-sectional area at the end 62 of the valve member 44. These differences in surface areas play an important function in controlling the position of the valve member 44. To augment the shifting of the valve member 44 to the position illustrated in FIG. 3, a compression spring 64 is provided between the end of the cylindrical chamber 39 and the end 63 of the valve member 44 and the purpose thereof will be explained in further detail below.

As stated above, a return line 16 is provided for returning diverted or dumped liquid from the dump valve 14 to the reservoir 12. The return line 16 is connected to an internally threaded third fluid port 66 via a conventional hose coupling or pipe coupling 67. The internally threaded opening 66 is connected by a passageway 68 to a further internally threaded opening 69 in which is received an externally threaded orifice plug 71 having a central orifice 72 extending centrally therethrough. In this particular embodiment, the cross-sectional area of the orifice 72 is the same as the cross-sectional area of the orifice 58 in the orifice plug 57. The externally threaded portion of the orifice plug 71 is threadedly engaged with the internally threaded opening 69. The orifice 72 provides communication between the passageway 68 and the interior of the return line 16 and the chamber 34 adjacent the central portion 51 of the valve member 44. In this particular embodiment, the orifice 72 is oriented between the first annular valve seat 43 and the segment of the cylindrical passageway 36 immediately adjacent the chamber 34.

OPERATION

Although the operation of the system 10 embodying the inventive dump valve 14 has been indicated somewhat above, the operation will be described in detail hereinbelow to assure a more complete understanding of the invention.

When the valve in the valve body 24 of the gun 21 illustrated in FIG. 1 is closed to thereby prevent fluid communication between the interior of the hose 19 and the nozzle 22, no fluid/liquid will flow through the dump valve 14 and particularly the passageway 54 so that the fluid pressure at the opposite ends 62 and 63 will have a tendency to become equalized. However, in view of the provision of the spring 64, the valve member 44 will be urged to the position illustrated in FIG. 3 so that liquid exiting the pump and into the inlet port 13 will be able to exit the valve body 29 through the passageways 54 and 59, the enlarged segment 61 of the cylindrical passageway 39 and the chamber 34 to the orifice 72 and thence to the return line 16. The orifice 72 is provided in the return line 16 so that a small pressure build up will occur in the chamber 34 and the segment 61 of the cylindrical passageway 39 so as to prevent the valve member 44 from inadvertently moving within the cylindrical passageways 36 and 39 and the chamber 34. The cross-sectional area of the orifice 58 is, as stated above, the same as the cross-sectional area of the orifice 72. Thus, the fluid pressure in the chamber 34 is the same as the fluid pressure at the outlet port 18 of the valve body 29. This pressure is considerably lower than the high pressure output capability of the pump 11, such as in the range of 300 to 500 PSI. Thus, the pressure within the conduit 19 is low and, therefore, poses no danger to personnel within the area and/or equipment while the gun 21 is not in use, but the pump 11 is continuing to operate.

However, when the valve in the valve body 24 of the gun 21 is opened by movement of the trigger 28, fluid will be allowed to flow from the interior of the conduit 19 to the nozzle 22. Since the orifice at the nozzle 22 is much smaller than the orifices 58 and 72, pressure will promptly begin to build up in the hose 19 and the interior of the valve body 29 of the dump valve 14. Liquid will also begin to promptly flow through the dump valve 14, particularly through the passageway 54 and orifice 58. Liquid flow through the orifice 58, due to its small size, will create a substantial pressure drop of about 300 to 500 PSI across same thereby making the pressure adjacent the end 63 substantially less than the fluid pressure adjacent the end 62 so as to cause the valve member 44 to be urged to the left with sufficient force to compress the spring 64 and to urge the second annular valve seat 53 into sealing engagement with the first annular valve seat 43. In this condition, the valve member 44 will be in the position illustrated in FIG. 2. Subsequently, and upon a closing of the valve in the valve body 24 of the gun 21, liquid flow through the valve member 44 will cease and the fluid pressure adjacent the end 63 of the valve member 44 coupled with the radially inner portion of the chamfer 52 radially inside the first annular valve seat 43 illustrated in FIG. 2 coupled with the force of the spring 64 will be sufficient to cause the valve member 44 to be promptly urged to the right, namely, the position illustrated in FIG. 3 to immediately divert or dump the fluid from the interior of the valve body through the passageway 59, the enlarged segment 61 of the cylindrical passageway 39 and chamber 34 to the outlet orifice 72 and thence to the return line 16.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A remote pressure sensitive dump valve, comprising:
    means defining a housing having a first fluid port means thereon adapted for connection to a source of pressurized fluid, a second fluid port means thereon adapted for connection to a remotely controllable fluid control valve operable between a closed condition blocking fluid flow and an open condition allowing fluid flow, and a third fluid port means thereon intermediate said first and second fluid port means adapted for connection to a conduit for dumping fluid when said remote controllable fluid control valve is in the closed condition;
    means defining a chamber in said housing connected in fluid circuit with said first, second and third fluid ports;
    an elongated valve member provided in said chamber and sealed support means for supporting opposite longitudinal ends of said valve member for movement between first and second positions, said valve member having means defining a first passageway therethrough enabling fluid flow from said first fluid port to said second fluid port regardless of the position of said elongated valve member, said valve member further having a second passageway enabling fluid flow from said first fluid port to said third fluid port only when said elongated valve member is in said second position;

means defining a first annular valve seat in said chamber between said second and third fluid ports and oriented in plane that is perpendicular to a longitudinal axis of said elongated valve member;

means defining a second annular valve seat on said elongated valve member axially opposing said first annular valve seat, said second annular valve seat sealingly engaging said first annular valve seat when said valve member is in said first position and being spaced from said first annular valve seat when said valve member is in said second position; and means between an end of said first passageway adjacent said second fluid port and said second passageway and within said first passageway that has a diameter smaller than a diameter of said first passageway for effecting a substantial fluid pressure drop between opposite ends of said first passageway means so that when the remotely controllable fluid control valve is open, fluid flow will occur through said first passageway means and said substantial pressure drop will occur to cause said valve member to be automatically urged to said first position, and when said remotely controllable fluid control valve is in the closed condition, fluid flows through said first passageway means unhalted to cause a sufficient pressure imbalance between the opposite ends of said valve member to effect an automatic movement of said valve member from said first position to said second position and a diverting of fluid to the third fluid port means.

2. The remote pressure sensitive dump valve according to claim 1, including a resilience means between said second fluid port means and said end of said valve member adjacent thereto to augment the movement of said valve member to said second position when said remotely controllable fluid control valve is closed.

3. The remote pressure sensitive dump valve according to claim 1, wherein said chamber includes further means for effecting a substantial fluid pressure drop from said chamber to said conduit into which fluid is dumped when said remote controllable valve is in the closed condition.

4. The remote pressure sensitive dump valve according to claim 3, wherein said means for effecting a substantial fluid pressure drop between opposite ends of said first passageway means and said further means are both orifice plugs each including means facilitating releasable securement, respectively, to said end of said valve member adjacent said second fluid port and inside said third fluid port means.

5. The remote pressure sensitive dump valve according to claim 1, wherein said first fluid port means includes a high pressure pump operable up to 30,000 PSI, said valve member responding immediately to a closing of said remotely controllable fluid control valve by moving to said second position to dump fluid to said third fluid port means.

6. The remote pressure sensitive dump valve according to claim 1, wherein said second annular valve seat has, when said valve member is in said second position, a totally exposed axially facing surface area that is greater than each axially facing surface area at the opposite ends of said valve member so that when said remotely controllable fluid control valve is in the closed condition and said valve member shifted to the second position thereof, the sum of the axially facing surface areas at an axial end of said valve member adjacent said second fluid port means and at said second annular valve seat exceeds the surface area at the axially facing surface area adjacent said first fluid port means to cause said valve member to be held by the pressurized fluid at said second position to effect a dumping of fluid from said first fluid port means to said third fluid port means through a gap between said first and second valve seats, said first annular valve seat, when said valve member is in said first position, engaging said second annular valve seat so that the axially facing surface area at the axial end of said valve member adjacent said first fluid port means exceeds the sum of the axially facing surface area at the axial end of said valve member adjacent the second fluid port means and the axially facing surface of the second annular valve seat radially inwardly from the location whereat said first and second valve seats engage one another.

7. The remote pressure sensitive dump valve according to claim 4, wherein each of said orifice plugs has an internal diameter orifice extending therethrough.

8. The remote pressure sensitive dump valve according to claim 7, wherein each orifice is of the same diameter.

9. The remote pressure sensitive dump valve according to claim 7, wherein said means for effecting a substantial fluid pressure drop between opposite ends of said first passageway means and said further means are both orifice plugs each including means facilitating releasable securement, respectively, to said end of said valve member adjacent said second fluid port and inside said third fluid port means.

10. The remote pressure sensitive dump valve according to claim 9, wherein each of said orifice plugs has an internal diameter orifice extending therethrough.

11. The remote pressure sensitive dump valve according to claim 10, wherein each orifice is of the same diameter.

12. The remote pressure sensitive dump valve according to claim 10, wherein said chamber includes a resilience means between said second fluid port means and said end of said valve member adjacent thereto to augment the movement of said valve member to said second position when said remotely controllable fluid control valve is closed.

13. A remote pressure sensitive dump valve, comprising:

means defining a housing having a first fluid port means thereon adapted for connection to a source of pressurized fluid, a second fluid port means thereon adapted for connection to a remotely controllable fluid control valve operable between a closed condition blocking fluid flow and an open condition allowing fluid flow, and a third fluid port means thereon intermediate said first and second fluid port means adapted for connection to a conduit for dumping fluid when said remote controllable fluid control valve is in the closed condition;

means defining a chamber in said housing connected in fluid circuit with said fist, second and third fluid ports;

an elongated valve member provided in said chamber and sealed support means for supporting opposite longitudinal ends of said valve member for movement between first and second positions, said valve member having means defining a first passageway therethrough enabling fluid flow from said first fluid port to said second fluid port regardless of the position of said elongated valve member, said valve member further having a second passageway enabling fluid flow from said first fluid port to said third fluid port only when said elongated valve member is in said second position;

means defining a first annular valve seat in said chamber between said second and third fluid ports and oriented in plane that is perpendicular to a longitudinal axis of said elongated valve member;

means defining a second annular valve seat on said elongated valve member axially opposing said first annular valve seat, said second annular valve seat sealingly engaging said first annular valve seat when said valve member is in said fist position and being spaced from said first annular valve seat when said valve member is in said second position;

means for effecting a substantial fluid pressure drop between opposite ends of said first passageway means so that when the remotely controllable fluid control valve is open, fluid flow will occur through said first passageway means and said substantial pressure drop will occur to cause said valve member to be automatically urged to said first position, and when said remotely controllable fluid control valve is in the closed condition, fluid flows through said first passageway means unhalted to cause a sufficient pressure imbalance between the opposite ends of said valve member to effect an automatic movement of said valve member from said first position to said second position and a diverting of fluid to the third fluid port means; and further means for effecting a substantial fluid pressure drop from said chamber to said conduit into which fluid is dumped when said remote controllable valve is in the closed condition.

14. The remote pressure sensitive dump valve according to claim 13, including a resilience means between said second fluid port means and said end of said valve member adjacent thereto to augment the movement of said valve member to said second position when said remotely controllable fluid control valve is closed.

15. The remote pressure sensitive dump valve according to claim 13, wherein said first fluid port means includes a high pressure pump operable up to 30,000 PSI, said valve member responding immediately to a closing of said remotely controllable fluid control valve by moving to said second position to dump fluid to said third fluid port means.

16. The remote pressure sensitive dump valve according to claim 13, wherein said second annular valve seat has, when said valve member is in said second position, a totally exposed axially facing surface area that is greater than each axially facing surface area at the opposite ends of said valve member so that when said remotely controllable fluid control valve is in the closed condition and said valve member shifted to the second position thereof, the sum of the axially facing surface areas at an axial end of said valve member adjacent said second fluid port means and at said second annular valve seat exceeds the surface area at the axially facing surface area adjacent said first fluid port means to cause said valve member to be held by the pressurized fluid at said second position to effect a dumping of fluid from said first fluid port means to said third fluid port means through a gap between said first and second valve seats, said first annular valve seat, when said valve member is in said first position, engaging said second annular valve seat so that the axially facing surface area at the axial end of said valve member adjacent said first fluid port means exceeds the sum of the axially facing surface area at the axial end of said valve member adjacent the second fluid port means and the axially facing surface of the second annular valve seat radially inwardly from the location whereat said first and second valve seats engage one another.

17. A remote pressure sensitive dump valve, comprising:

means defining a housing having a first fluid port means thereon adapted for connection to a source of pressurized fluid, a second fluid port means thereon adapted for connection to a remotely controllable fluid control valve operable between a closed condition blocking fluid flow and an open condition allowing fluid flow, and a third fluid port means thereon intermediate said first and second fluid port means adapted for connection to a conduit for dumping fluid when said remote controllable fluid control valve is in the closed condition;

means defining a chamber in said housing connected in fluid circuit with said first, second and third fluid ports;

an elongated valve member provided in said chamber and sealed support means for supporting opposite longitudinal ends of said valve member for movement between first and second positions, said valve member having means defining a first passageway therethrough enabling fluid flow from said first fluid port to said second fluid port regardless of the position of said elongated valve member, said valve member further having a second passageway enabling fluid flow from said first fluid port to said third fluid port only when said elongated valve member is in said second position;

means defining a first annular valve seat in said chamber between said second and third fluid ports and oriented in plane that is perpendicular to a longitudinal axis of said elongated valve member;

means defining a second annular valve seat on said elongated valve member axially opposing said firs annular valve seat, said second annular valve seat sealingly engaging said first annular valve seat when said valve member is in said first position and being spaced from said first annular valve seat when said valve member is in said second position;

means for effecting a substantial fluid pressure drop between opposite ends of said first passageway means so that when the remotely controllable fluid control valve is open, fluid flow will occur through said first passageway means and said substantial pressure drop will occur to cause said valve member to be automatically urged to said first position, and when said remotely controllable fluid control valve is in the closed condition, fluid flows through said first passageway means unhalted to cause a sufficient pressure imbalance between the opposite ends of said valve member to effect an automatic movement of said valve member from said first position to said second position and a diverting of fluid to the third fluid port means; and said second annular valve seat has, when said valve member is in said second position, a totally exposed axially facing surface area that is greater than each axially facing surface area at the opposite ends of said valve member so that when said remotely controllable fluid control valve is in the closed condition and said valve member shifted to the second position thereof, the sum of the axially facing surface areas at an axial end of said valve member adjacent said second fluid port means and at said second annular valve seat exceeds the surface area at the axially facing surface area adjacent said first fluid port means to cause said valve member to be held by the pressurized fluid at said second position to effect a dumping of fluid from said first fluid port means to said third fluid port means through a gap between said first and second valve seats, said first annular valve seat, when said valve member is in said first position, engaging said second annular valve seat so that the axially facing surface area at the axial end of said valve member adjacent said first fluid port means exceeds the sum of the axially facing surface area at the axial end of said valve member adjacent the second fluid port means and the axially facing surface of the second annular valve seat radially inwardly from the location whereat said first and second valve seat engage one another.

18. The remote pressure sensitive dump valve according to claim 16, wherein said housing includes further means for effecting a substantial fluid pressure drop from said chamber to said conduit into which fluid is dumped when said remote controllable valve is in the closed condition.

19. The remote pressure sensitive dump valve according to claim 18, wherein said means for effecting a substantial fluid pressure drop between opposite ends of said first passageway means and said further means are both orifice plugs each including means facilitating releasable securement, respectively, to said end of said valve member adjacent said second fluid port and inside said third fluid port means.

20. The remote pressure sensitive dump valve according to claim 19, wherein each of said orifice plugs has an internal diameter orifice extending therethrough.

21. The remote pressure sensitive dump valve according to claim 20, wherein each orifice is of the same diameter.

22. The remote pressure sensitive dump valve according to claim 16, wherein said first fluid port means includes a high pressure pump operable up to 30,000 PSI, said valve member responding immediately to a closing of said remotely controllable fluid control valve by moving to said second position to dump fluid to said third fluid port means.

* * * * *

UNITED STATES PATENT AND TRADEMARK OFFICE
CERTIFICATE OF CORRECTION

PATENT NO. : 5 311 905
DATED : May 17, 1994
INVENTOR(S) : Gerard J. DE SANTIS

It is certified that error appears in the above-identified patent and that said Letters Patent is hereby corrected as shown below:

Column  8, line 61; change "fist" to ---first---.
Column  9, line 15; change "fist" to ---first---.
Column 10, line 42; change "firs" to ---first---.
Column 11, line 21; change "seat" to ---seats---.
           line 24; change "Claim 16" to ---Claim 17---.
Column 12, line 19; change "Claim 16" to ---Claim 17---.

Signed and Sealed this

Thirteenth Day of September, 1994

Attest:

BRUCE LEHMAN

*Attesting Officer*    *Commissioner of Patents and Trademarks*